United States Patent
Aare

(10) Patent No.: US 8,037,783 B2
(45) Date of Patent: Oct. 18, 2011

(54) DEVICE FOR A CLAMPING BOLT

(75) Inventor: Arne Aare, Sandnes (NO)

(73) Assignee: Bolt Norge AS, Bryne (NO)

( * ) Notice: Subject to any disclaimer, the term of this patent is extended or adjusted under 35 U.S.C. 154(b) by 260 days.

(21) Appl. No.: 12/268,928

(22) Filed: Nov. 11, 2008

(65) Prior Publication Data
US 2009/0120234 A1    May 14, 2009

(30) Foreign Application Priority Data
Nov. 12, 2007    (NO) .................................. 20075786

(51) Int. Cl.
*F16C 9/04*    (2006.01)
(52) U.S. Cl. ..................................... 74/579 R
(58) Field of Classification Search ................ 74/579 R, 74/580; 91/491; 92/58, 148, 187; 123/44, 123/54.2, 44 R
See application file for complete search history.

(56) References Cited

U.S. PATENT DOCUMENTS

| | | | |
|---|---|---|---|
| 3,161,185 A * | 12/1964 | Justinien et al. ............ | 123/78 R |
| 4,398,862 A * | 8/1983 | Schroeder .................... | 414/723 |
| 4,652,167 A * | 3/1987 | Garman ....................... | 403/158 |
| 5,209,594 A | 5/1993 | Svensson et al. | |
| 5,251,986 A | 10/1993 | Arena | |
| 5,551,794 A * | 9/1996 | Aarre et al. ................. | 403/374.4 |
| 6,039,497 A * | 3/2000 | Gullberg ....................... | 403/16 |
| 6,575,659 B1 * | 6/2003 | Valtwies et al. ............. | 403/370 |
| 6,599,052 B1 * | 7/2003 | Phillips ........................ | 403/367 |

OTHER PUBLICATIONS

NO Search Report from Application No. NO20075786 dated Nov. 6, 2008.

* cited by examiner

*Primary Examiner* — Vicky A Johnson
(74) *Attorney, Agent, or Firm* — Patterson & Sheridan, L.L.P.

(57) ABSTRACT

A device for a clamping bolt comprising a shaft for interconnection of a first body and a second body, wherein the first body is provided with a first bore and the second body is provided with a second bore, the clamping bolt extending within the bores, and wherein the clamping bolt is provided with an internally conical first clamping sleeve which is located, at least partially, within the first bore, and wherein the first clamping sleeve, by moving it in the longitudinal direction of the shaft, is structured so as to be able to be clamped against the first body, and wherein the clamping bolt is provided with an internally conical second clamping sleeve which is located, at least partially, within the second bore, and which is structured so as to be able to be clamped against the second body by moving it in the longitudinal direction of the shaft, the first clamping sleeve encircling the second clamping sleeve.

9 Claims, 3 Drawing Sheets

DEVICE FOR A CLAMPING BOLT

CROSS-REFERENCE TO RELATED APPLICATIONS

This application claims benefit of Norwegian patent application number 20075786, filed Nov. 12, 2007, which is herein incorporated by reference.

BACKGROUND OF THE INVENTION

1. Field of the Invention

This invention concerns a clamping bolt. More particularly, it concerns a clamping bolt comprising a shaft for interconnection of a first body and a second body, wherein the first body is provided with a first bore and the second body is provided with a second bore, the clamping bolt extending within the bores, and wherein the clamping bolt is provided with an internally conical first clamping sleeve which is located, at least partially, within the first bore, and wherein the first clamping sleeve, by moving it in the longitudinal direction of the shaft, is structured so as to be able to be clamped against the first body. The clamping bolt is provided with a second internally conical clamping sleeve which is located, at least partially, within the second bore, and which is structured so as to be able to be clamped against the second body by moving it in the longitudinal direction of the shaft, the first clamping sleeve encircling the second clamping sleeve.

2. Description of the Related Art

Interconnection of bodies by means of a shaft is well-known from machine design, among other things. A typical embodiment comprises two plate portions with an intermediate body, for example in the form of a piston rod attachment of a hydraulic cylinder. Typically, the shaft extending within the bores in the plate portions and the intermediate body is provided with means for preventing the shaft from rotating within the bores.

Over time, due to wear and tear, it may be found that the bores increase in diameter and thus develop an inappropriately large clearance relative to the shaft. It is known to provide the shaft with a clamping sleeve for each of the plate portions, wherein each clamping sleeve, by moving it in the longitudinal direction of the shaft, is structured so as to be able to accommodate said diameter increase within its respective bore.

However, prior art shafts are not formed so as to be able to be clamped against the intermediate body.

SUMMARY OF THE INVENTION

The object of the invention is to remedy or reduce at least one of the disadvantages of the prior art.

The object is achieved in accordance with the invention by virtue of the features disclosed in the following description and in the subsequent claims.

A clamping bolt according to the invention, comprising a shaft for interconnection of a first body and a second body, wherein the first body is provided with a first bore and the second body is provided with a second bore, the clamping bolt extending within the bores, and wherein the clamping bolt is provided with an internally conical first clamping sleeve which is located, at least partially, within the first bore, and wherein the first clamping sleeve, by moving it in the longitudinal direction of the shaft, is structured so as to be able to be clamped against the first body, is characterized in that the clamping bolt is provided with a second internally conical clamping sleeve which is located, at least partially, within the second bore, and which is structured so as to be able to be clamped against the second body by moving it in the longitudinal direction of the shaft, the first clamping sleeve encircling the second clamping sleeve.

Typically, the second clamping sleeve, which may be slotted, extends from the one end portion of the shaft and into the second bore. The first clamping sleeve, which also may be slotted, and which encircles the second clamping sleeve, typically is disposed at the same end portion of the shaft.

Normally, the first clamping sleeve is formed with an external cylinder-shape, but possibly it may be adapted to the geometry of the first bore. The internally conical surface of the first clamping sleeve fits in a complementary manner to an externally conical first surface of the second clamping sleeve.

Normally, the second clamping sleeve is also formed with an external cylinder surface fitting within the second bore, but the clamping sleeve may be adapted, if required, to the geometry of the second bore. The internally conical surface of the second clamping sleeve fits in a complementary manner to a second externally conical surface located on the shaft.

Advantageously, the conical sleeves are clamped individually, for example by means of screw connections. Hydraulic clamping may prove appropriate for large clamping bolts.

A clamping bolt according to the invention allows for individual clamping of a second body located, as counted from the end portion of the shaft, within the first body. Wear and tear inside the second bore may thus be compensated for simply by moving the second clamping sleeve into and over the shaft until the second body is fixed relative to the shaft. Then, the first clamping sleeve is moved into and over the second clamping sleeve until the first clamping sleeve, and thus the first body, is fixed relative to the shaft.

In a practical embodiment, the clamping bolt is provided with one set of clamping sleeves at both end portions of the shaft, whereby two second bodies may be clamped, or whereby a second body may be clamped from two sides.

A clamping bolt according to the invention is also suitable for connecting constructions, wherein at least one of the first and second bores, e.g. to facilitate the assembly work, is/are provided with bores having a somewhat larger diameter than the diameter of the shaft to be used.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
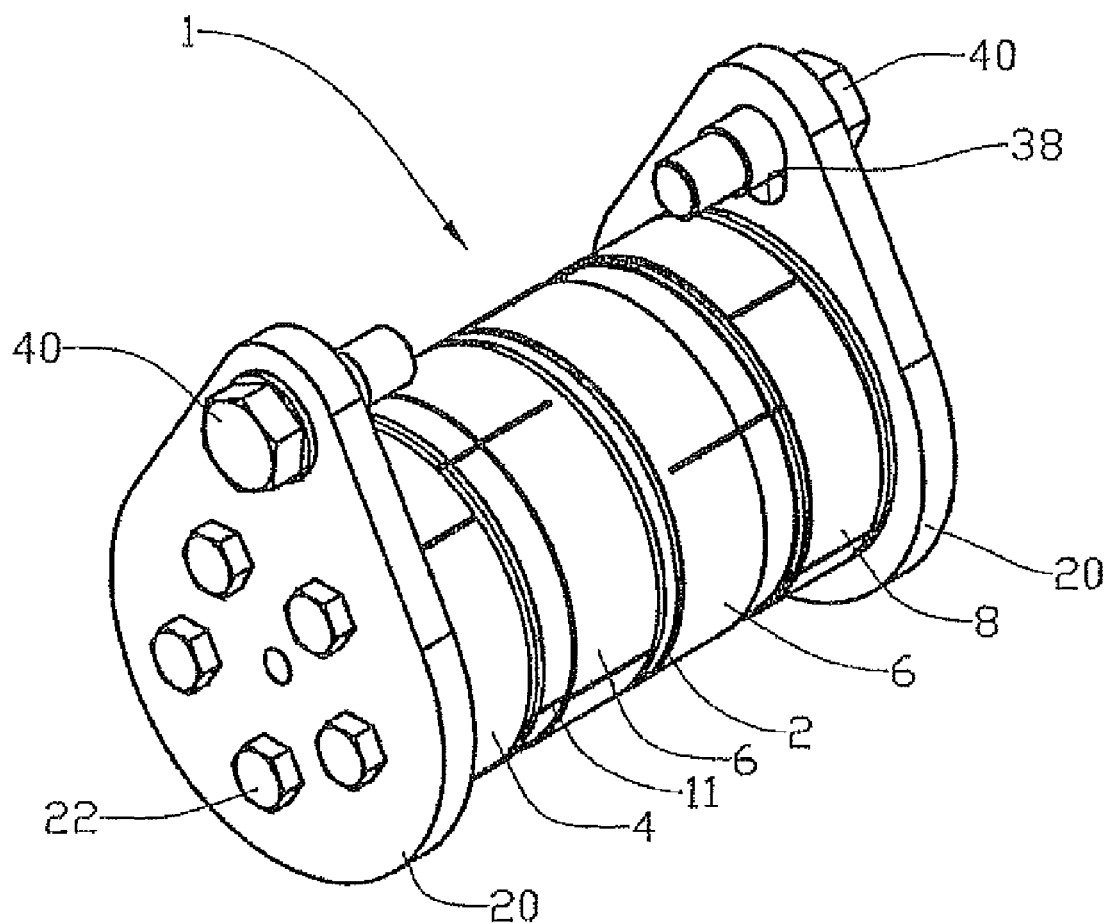
FIG. 1 shows a clamping bolt in accordance with the invention.

In the drawing, reference numeral 1 denotes a clamping bolt in accordance with the invention comprising a shaft 2, two first clamping sleeves 4 and two second clamping sleeves 6.

Figure 2:
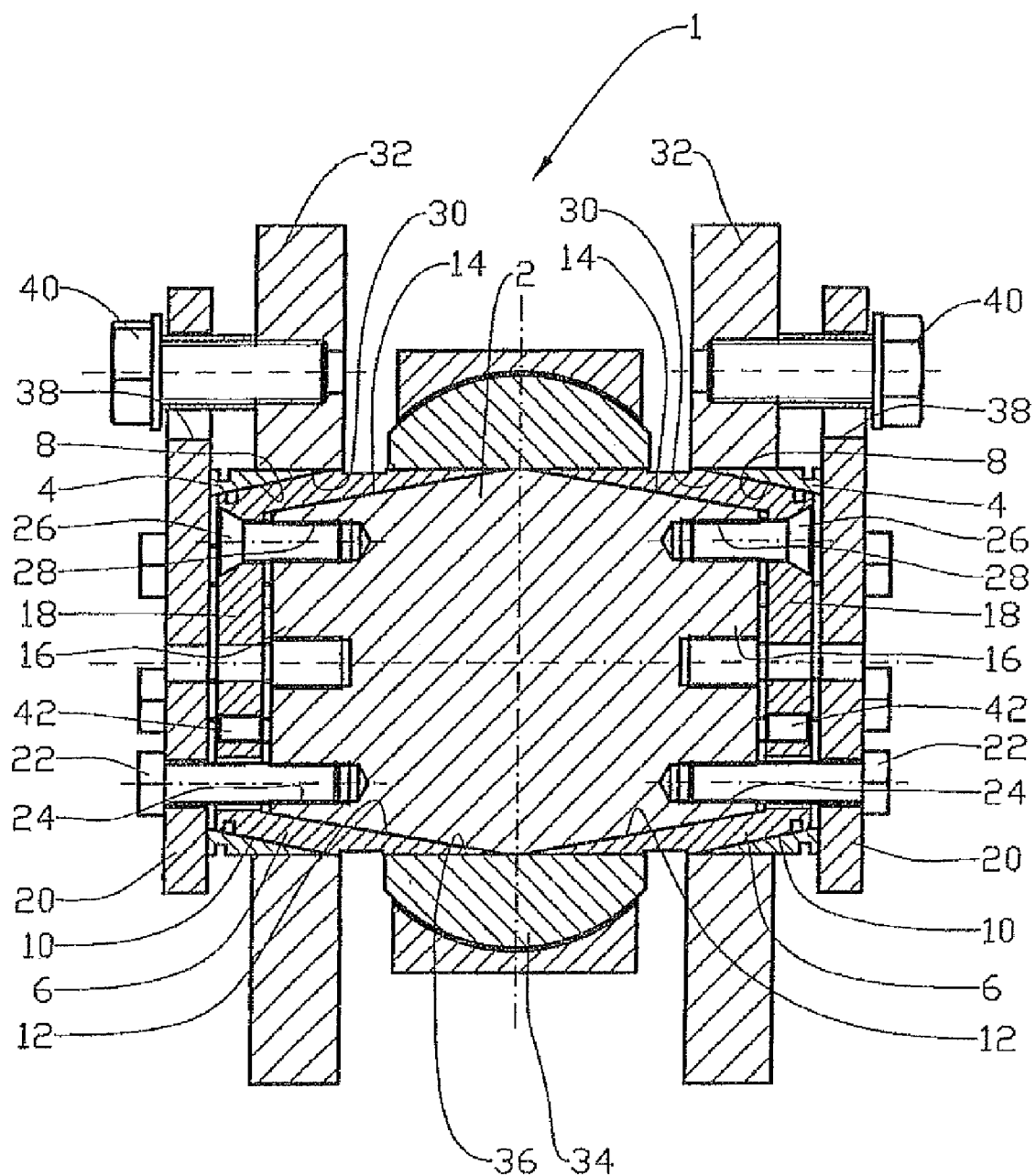
FIG. 2 shows, in cross-section, an assembled clamping bolt.

Internally, the first clamping sleeve 4 is provided with a conical surface 8 fitting in a complementary manner on a first externally conical surface 10 on the second clamping sleeve 6, see FIG. 2. By moving the first clamping sleeve 4 inwards and along the second clamping sleeve 6, the external diameter of the first clamping sleeve 4 is increased. The clamping sleeves 4 and 6 are provided with axial slits 11.

The second clamping sleeve 6 is provided with an internally conical surface 12 fitting on a second externally conical surface 14 extending inwards from the end portion 16 of the shaft 2. The external diameter of the second clamping sleeve 6 is increased by moving the second clamping sleeve 6 inwards and along the shaft 2.

In this preferred example of an embodiment, the second clamping sleeve 6 is given a cup-shape, wherein the bottom 18 of the second clamping sleeve 6 substantially covers the end portion 16 of the shaft 2.

A clamping plate 20, which bears against the external end portion of the first clamping sleeve 4, is disposed outside the end portion 16 of the shaft 2. A number of first tightening bolts 22 extend through the clamping plate 20 and the bottom 18 of the second clamping sleeve 6 onwards to complementarily fitted threads 24 at the end portion 16 of the shaft 2.

A number of second tightening bolts 26 extend through the bottom 18 and onwards to complementarily fitted threads 28 at the end portion 16 of the shaft 2.

In FIG. 2, the clamping bolt 1 is disposed in two first bores 30 in two first bodies 32 in the form of a cylinder attachment. A second body 34 in the form of a piston rod head is provided with a second bore 36 and is located between the two first bodies 32.

The first clamping sleeve 4 is located in the first bore 30 in the first body 32, whereas the second clamping sleeve 6 extends into the second bore 36 in the second body 34.

The clamping plate 20 is formed with a through-going opening 38 for a localizer bolt 40, which is threaded into the first body 32. A locking bolt 42 is threaded into the bottom 18.

When the clamping bolt 1 is disposed in the bores 30, 36, the second tightening bolts 26 are moved in towards the end portion 16 of the shaft 2, preferably applying a specific torque, whereby the second clamping sleeve 6 is moved inwards onto the shaft 2. The second clamping sleeve 6 is thus clamped within the second bore 36, but not in the first bore 30. Then the locking bolts are tightened, thereby preventing the second clamping sleeve 6 from being moved into and over the shaft 2.

By tightening the first tightening bolts 22, the clamping plate 20 moves the first clamping sleeve 4 inwards on the second clamping sleeve 6, whereby the first clamping sleeve 4 is clamped within the first bore 30.

Figure 3:
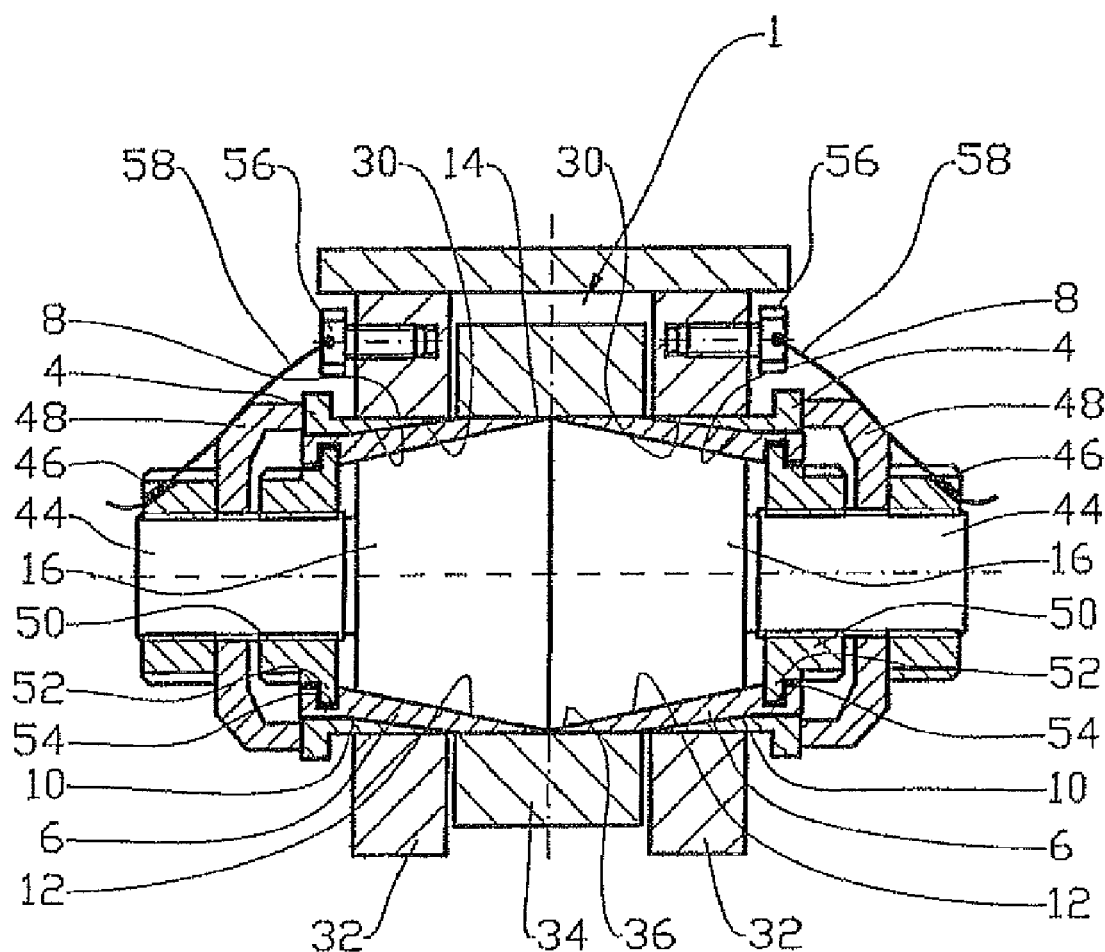
FIG. 3 shows, in cross-section, an assembled clamping bolt of an alternative embodiment.

In an alternative embodiment, see FIG. 3, the shaft is formed with two threaded pins 44 extending concentrically outwards from each of the end portions 16 of the shaft 2.

A first nut 46, which is located on the pin 44, is tightened against the first clamping sleeve 4 via a clamping cup 48. A second nut 50, which also is located on the pin 44, is provided externally with a flange-like, outwardly extending spandrel 52. The spandrel 52 fits in a complementary manner into a groove 54 in the second clamping sleeve 6.

In a manner similar to that described hereinbefore, the second clamping sleeve 6 is moved along the shaft 2 by means of the second nut 50. The first clamping sleeve 4 is moved inwards and along the second clamping sleeve 6 by means of the first nut 46 and the clamping cup 48.

The first nut 46 may be locked by means of a locking screw 56 and locking wire 58.

This alternative embodiment is most appropriate for smaller clamping bolts 1 having limited space for the first and the second tightening bolts 22, 26.

While the foregoing is directed to embodiments of the present invention, other and further embodiments of the invention may be devised without departing from the basic scope thereof, and the scope thereof is determined by the claims that follow.

The invention claimed is:

1. A device for a clamping bolt comprising a shaft for interconnection of a first body and a second body, wherein the first body is provided with a first bore and the second body is provided with a second bore, the clamping bolt extending within the bores, and wherein the clamping bolt is provided with an internally conical first clamping sleeve which is located, at least partially, within the first bore, and wherein the first clamping sleeve is movable in the longitudinal direction of the shaft to clamp the first clamping sleeve against the first body, wherein the clamping bolt is provided with an internally conical second clamping sleeve which is located, at least partially, within the second bore, and the second clamping sleeve is movable in the longitudinal direction of the shaft to clamp the second clamping sleeve against the second body, the first clamping sleeve encircling the second clamping sleeve.

2. The device according to claim 1, wherein at least one of the first clamping sleeve and the second clamping sleeve is/are provided with a slit.

3. The device according to claim 1, wherein the first clamping sleeve and the second clamping sleeve are located at the same end portion of the shaft.

4. The device according to claim 1, wherein at least one of the first clamping sleeve and the second clamping sleeve is/are cylindrical externally.

5. The device according to claim 1, wherein the first clamping sleeve is provided with an internally conical surface fitting that is configured to mate with an externally conical first surface on the second clamping sleeve.

6. The device according to claim 1, wherein the second clamping sleeve is provided with an internally conical surface fitting that is configured to mate with an externally conical second surface located on the shaft.

7. The device according to claim 1, wherein the clamping sleeves are structured so as to be able to be clamped by means of screw elements.

8. The device according to claim 1, wherein the second clamping sleeve is provided with an adjustable locking bolt structured so as to be able to prevent the second clamping sleeve, after tightening thereof, from being moved further into and over the shaft.

9. The device according to claim 1, wherein the shaft is provided with a first clamping sleeve and a second clamping sleeve at each of its two end portions.

* * * * *